United States Patent
Barlow et al.

(10) Patent No.: US 10,628,430 B2
(45) Date of Patent: Apr. 21, 2020

(54) MANAGEMENT OF INTENDED FUTURE CONVERSATIONS

(71) Applicant: International Business Machines Corporation, Armonk, NY (US)

(72) Inventors: W. Caleb Barlow, Newburyport, MA (US); James E. Christensen, Cortlandt Manor, NY (US); David S. Marshak, Wrentham, MA (US); Andrew L. Schirmer, Andover, MA (US); Tracee L. Wolf, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 428 days.

(21) Appl. No.: 13/724,104

(22) Filed: Dec. 21, 2012

(65) Prior Publication Data

US 2014/0181092 A1 Jun. 26, 2014

(51) Int. Cl.
*G06F 16/2457* (2019.01)
*G06Q 10/10* (2012.01)

(52) U.S. Cl.
CPC ....... *G06F 16/24578* (2019.01); *G06Q 10/10* (2013.01)

(58) Field of Classification Search
CPC .......................... G06F 16/24578; G06Q 10/10
See application file for complete search history.

(56) References Cited

U.S. PATENT DOCUMENTS

| | | | |
|---|---|---|---|
| 7,693,736 B1 | 4/2010 | Chu et al. | |
| 8,429,292 B2* | 4/2013 | Adams et al. | 709/238 |
| 9,224,134 B2 | 12/2015 | Christensen et al. | |
| 2004/0161090 A1 | 8/2004 | Digate et al. | |
| 2006/0271419 A1* | 11/2006 | O'Sullivan | 705/8 |
| 2007/0226035 A1 | 9/2007 | Doss et al. | |

(Continued)

OTHER PUBLICATIONS

"Wiki for Intelligent Semantic Event Reporting (WISER)," [online] United States Government, Small Business Innovation Research / Small Business Technology Transfer "SBIR/STTR" [ retrieved Dec. 19, 2012] retrieved from the Internet: <http://www.sbir.gov/sbirsearch/detail/7517>, 2 pgs.

(Continued)

*Primary Examiner* — Robert W Beausoliel, Jr.
*Assistant Examiner* — Hau Hoang
(74) *Attorney, Agent, or Firm* — Cuenot, Forsythe & Kim, LLC (57) ABSTRACT

Arrangements relate to the management of data items representing intended future conversations. A plurality of first inputs related to a respective intended future conversation can be received. At least one data item representing the respective intended future conversation can be created for each first input. At least one attribute can be received for each of the plurality of intended future conversations associated with-each first input. In response to receiving at least one attribute for each of the plurality of the intended future conversations associated with each first input, the plurality of intended future conversations associated with each first input can be ranked in a particular order based on at least one of the received attributes. A listing of the intended future conversations that is based on the ranking can be generated.

20 Claims, 4 Drawing Sheets

(56) References Cited

U.S. PATENT DOCUMENTS

| | | | |
|---|---|---|---|
| 2008/0040189 A1 | 2/2008 | Tong et al. | |
| 2008/0313713 A1 | 12/2008 | Cutler | |
| 2008/0320025 A1 | 12/2008 | Ozzie et al. | |
| 2009/0055236 A1* | 2/2009 | O'Sullivan et al. | 705/8 |
| 2009/0217176 A1* | 8/2009 | Coulomb et al. | 715/751 |
| 2011/0184772 A1 | 7/2011 | Norton et al. | |
| 2011/0320237 A1 | 12/2011 | Beaman et al. | |
| 2012/0022909 A1 | 1/2012 | Ayatollahi et al. | |
| 2013/0217364 A1 | 8/2013 | Varoglu et al. | |
| 2013/0246116 A1 | 9/2013 | Bank et al. | |
| 2014/0181094 A1 | 6/2014 | Barlow et al. | |
| 2014/0181696 A1 | 6/2014 | Christensen et al. | |

OTHER PUBLICATIONS

Walling, S., "Top 10 Apps for Scheduling a Meeting Online," [online] ReadWrite Enterprise, © 2012 SAY Media, Inc., Sep. 4, 2009 [retrieved Dec. 19, 2012] retrieved from the Internet: <http://readwrite.com/2009/09/04/the-top-ten-apps-for-scheduling-a-meeting-online>, 6 pgs.

"Group Scheduling Software-Meeting Schedule Software," [online] Asure Software, © 2012 PeopleCube [retrieved Dec. 19, 2012] retrieved from the Internet: <http://www.asuresoftware.com/PeopleCube/products-other-meeting-maker-features.htm>, 3 pgs.

Whitney, L., "Apple invention would let you check the status of another iPhone user," [online] CNET News, Aug. 22, 2013 [retrieved Sep. 8, 2013] retrieved from the Internet: <http://news.cnet.com/8301-13579_3-57599685-37/apple-invention-would-let-you-check-the-status-of-another-iphone-user/>, 3 pg.

U.S. Appl. No. 13/723,777, Non-Final Office Action, dated Nov. 4, 2014, 17 pg.

U.S. Appl. No. 13/723,777, Final Office Action, dated Apr. 7, 2015, 22 pg.

U.S. Appl. No. 13/723,777, Advisory Action, dated Jun. 25, 2015, 9 pg.

U.S. Appl. No. 13/723,777, Notice of Allowance, dated Aug. 14, 2015, 15 pg.

U.S. Appl. No. 14/022,320, Non-Final Office Action, dated Nov. 24, 2014, 30 pg.

U.S. Appl. No. 14/022,320, Final Office Action, dated Mar. 18, 2015, 29 pg.

U.S. Appl. No. 14/022,320, Examiner's Answer to Appeal Brief, dated Oct. 21, 2015, 13 pg.

* cited by examiner

MANAGEMENT OF INTENDED FUTURE CONVERSATIONS

BACKGROUND

Arrangements described herein relate to planning future conversations between two or more participants.

In most facets of life, the need arises to discuss a topic with one or more persons or organizations at some point in the future. Scheduling a meeting requires interactions with other people in advance, often involves rescheduling. There are various techniques and tools to assist an individual in planning future activities and to remember the topics for discussion. Examples of such techniques and tools include making mental notes, writing "to do" lists, making calendar entries, sticky notes, asking someone or something (e.g. a computer) to remind us, bulletin boards, etc. For instance, when using a calendar entry, a user may initially guess at an appropriate date/time.

BRIEF SUMMARY

One or more embodiments disclosed within this specification relate to planning future conversations between two or more participants, and, more particularly, to the management of intended future conversations.

A system includes a processor programmed to initiate executable operations. The executable operations can include receiving a plurality of first inputs from a first user, each first input being related to a respective intended future conversation, each first input creating at least one data item representing the respective intended future conversation. The executable operations also can include receiving at least one attribute for each of the plurality of intended future conversations associated with each first input, the at least one attribute indicating a certain equipment required for a corresponding intended future conversation. The executable operations also can include, responsive to receiving at least one attribute for each of the plurality of the intended future conversations associated with each first input, a conversation module executed by the processor automatically ranking the plurality of intended future conversations associated with each first input in a particular order based on at least one of the received attributes indicating the certain equipment required for the corresponding intended future conversation. The executable operations also can include generating a listing of the intended future conversations that is based on the ranking.

A computer program product includes a computer readable storage medium having program code stored thereon. The program code is executable by a processor to perform a method. The method can include receiving, by the processor, a plurality of first inputs from a first user, each first input being related to a respective intended future conversation, each first input creating at least one data item representing the respective intended future conversation. The method also can include receiving, by the processor, at least one attribute for each of the plurality of intended future conversations associated with each first input, the at least one attribute indicating a certain equipment required for a corresponding intended future conversation. The method also can include, responsive to receiving at least one attribute for each of the plurality of the intended future conversations associated with each first input, a conversation module executed by the processor automatically ranking the plurality of intended future conversations associated with each first input in a particular order based on at least one of the received attributes indicating the certain equipment required for the corresponding intended future conversation. The method also can include generating, by the processor, a listing of the intended future conversations that is based on the ranking.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The term computer-readable storage medium means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute by the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The arrangements described herein relate to managing data items representing intended future conversations. A "conversation" is any exchanges of thoughts, information and/or ideas between two or more individuals in any form and by any suitable means. In the way of examples, a conversation may take place during an in-person meeting, a telephone call, a video chat, instant messaging, email, text messaging, a facsimile, social networking websites, etc. A conversation may be synchronous, semi-synchronous, or even asynchronous. Arrangements described herein can facilitate the planning of future intended conversations by taking into account the special attributes of conversation, using such special attributes to help the user see information and patterns to better organize and plan, and capitalize on changing opportunities for collaboration.

Figure 1:
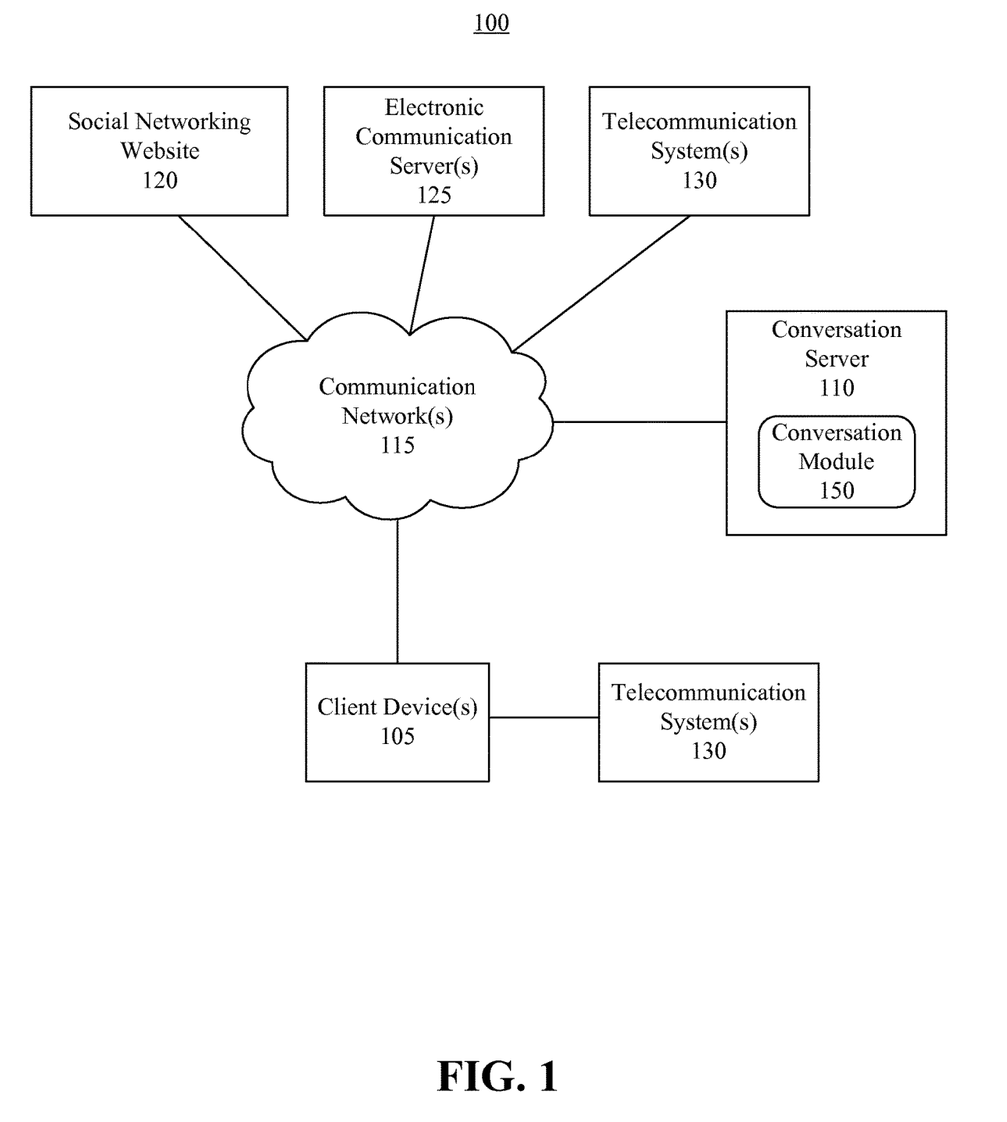
FIG. 1 is a block diagram illustrating a system for managing future intended conversations in accordance with one embodiment disclosed within this specification.

FIG. 1 depicts a block diagram illustrating a system 100 for managing future intended conversations in accordance with one embodiment disclosed within this specification. The system 100 can include one or more client devices 105 used by one or more users. The one or more client devices 105 can be any suitable device including, for example, a smart phone, a computer (e.g., a laptop, tablet, desktop, etc.), personal digital assistant ("PDA"), in-car hands free phone, a portable communication device, a portable computing device, etc. In some instances, the one or more client devices 105 can be configured to communicate via a wireless and/or wired medium.

The system 100 can include a conversation server 110, which can be communicatively linked to the one or more client devices 105 via one or more communication networks 115. When there is a plurality of client devices 105, the client devices also may be communicatively linked to one another via the one or more communication networks 115. As used herein, the term "communicatively linked" can include direct or indirect connections through a communication channel or pathway or another component or system. A "communication network" means one or more components designed to transmit and/or receive information from one source to another. The communication network 115 can include wired communication links and/or wireless communication links. The communication network 115 can comprise the Internet, a wide area network (WAN), wireless wide area network (WWAN), a local area network (LAN), wireless local area network (WLAN), a wireless communication network and/or the like. The communication network 115 can include any combination of the above networks and/or other types of networks. The network can include one or more routers, switches, access points, wireless access points, and/or the like.

The system 100 can include one or more social networking websites 120. "Social networking website" as used herein refers to web-based technologies used to turn communication into interactive dialogue between organizations, communities, and individuals. Examples of social networking websites include, for example, collaborative projects (e.g., Wikipedia), blogs and micro blogs (e.g., Twitter), content communities (e.g., YouTube), social networking sites (e.g., Facebook, LinkedIn, Google Plus, MySpace) and virtual gaming worlds. The social networking website 120 can support messaging (e.g., an electronic mail system, an instant messaging (IM) system, a Short Messaging System (SMS), or the like). The one or more social media websites 120 can be communicatively linked to the one or more client devices 105 and/or the conversation server 110.

The system 100 can include one or more electronic communication servers 125. The electronic communication server 125 can be implemented as, for example, an electronic mail system, a calendar system (included in or separate from the electronic mail system), an instant messaging (IM) system, a text messaging system, video chat system (e.g. Skype), or the like. In this regard, the electronic communication server 125 can be implemented as an electronic mail server, an instant messaging server, a text messaging server, a video chat server or other communication hub or server capable of routing electronic communications within or as part of the communication network 115. The electronic communication server 125 can include suitable operational software for performing the various functions described herein. The one or more electronic communication servers 125 can be communicatively linked to the one or more client devices 105 and/or the conversation server 110.

The system 100 can include one or more telecommunication systems 130. The telecommunication servers 125 can be implemented as, for example, a telephone system (e.g. Voice over Internet Protocol (VoIP) system), a voicemail system, a facsimile system, and the like. In this regard, the one or more telecommunication systems 130 can be implemented as a telephone server, a voicemail server, a facsimile server, or other communication hub or server capable of routing telecommunications within or as part of the communication network 115. The one or more telecommunication systems 130 can include suitable operational software for performing the various functions described herein. The one or more telecommunication systems 130 can be communicatively linked to the one or more client devices 105 and/or the conversation server 110. The telecommunication system 130 may support messaging.

The one or more telecommunication systems 130 can be directly linked to the one or more client devices 105. Alternatively or in addition, a telecommunication system 130 can be communicatively linked to the one or more client devices 105 via the communication network 115. One or more telecommunication systems 130 can be communicatively linked to the one or more client device 105 in both of these manners.

The system 100 can include a conversation module 150. In one embodiment, the conversation module 150 can be stored and/or executed on the one or more client devices 105. Alternatively or in addition, the conversation module 150 can be stored and/or executed on a conversation server 110. As a further implementation, which can be as an alternative or in addition to the above, the conversation module 150 can be stored and/or executed on the one or more social networking websites 120, the one or more electronic communication servers 125, the one or more telecommunication systems 130 and/or the one or more telecommunication systems 130.

The conversation module 150 can receive and/or store a plurality of first inputs. For instance, the conversation module 150 can receive and/or store a plurality of first inputs relating to a respective intended future conversation. At least one data item that represents the respective intended future conversation can be created by each first input.

The conversation module 150 can receive the plurality of first inputs in any suitable manner. For instance, one or more of the plurality of first inputs can be received from a user by input on the one or more client devices 105. As used herein, "user" means one or more persons. Accordingly, the client device 105 can include an input system for receiving user inputs. Any suitable input system can be used, including, for example, a keypad, display, touch screen, button, joystick, mouse, trackball, microphone or combinations thereof.

Alternatively or in addition, one or more of the plurality of first inputs can be received from an external information source. "External information source" means any source of information regarding the intention to have a future conversation that is not directly input by a user on the client device 105. For instance, the external information source can be the one or more social networking websites 120, the one or more electronic communication servers 125, the one or more telecommunication systems 130, and any combination thereof. The conversation module 150 can be configured to acquire one or more first inputs relating to the intention to have a future conversation from an external information source. For instance, the conversation module 150 can be configured to automatically acquire one or more first inputs. Such automatic acquiring may occur on any suitable basis, including, for example, continuously, periodically or randomly. Alternatively or in addition, the conversation module 150 can be configured to acquire the first inputs upon receiving a user command. The conversation module 150 can be configured by the user or some other entity or by a system default as to which external information sources to search for one or more first inputs relating to the intention to have a future conversation.

Responsive to receiving each first input, the conversation module 150 can be configured to receive one or more attributes related to the particular intended future conversation associated with the first input. "Attribute" is defined as any property, characteristic, requirement or information associated with an intended future conversation that provides context for the conversation. As will be explained herein, such attributes can facilitate the managing, organizing and/or prioritizing of intended future conversations.

One example of an attribute is the identity of one or more participants of the intended future conversation. The one or more participants can include persons, entities, organizations, and/or other identity. The originating user may or may not be a participant in the conversation. "Originating user" is defined as the user inputting the first input or the user who is using the system to acquire the first input. The originating user may or may not be a participant in the conversation. Another attribute may be the importance, relevance and/or relationship (e.g., work, colleague, vendor, boss, subordinate, certain function units within an organization, etc.) of a participant to the originating user or to some other reference point.

Another example of an attribute is the subject of the conversation. The subject may be a topic, a question, a keyword, a project name, an issue, etc. Another attribute can be the importance of the subject, to the originating user or some other reference point.

A further example of an attribute is the expected duration of the conversation. Yet another example of an attribute is the time sensitivity of the conversation. For instance, the time sensitivity can be a deadline to have the conversation, the urgency of the conversation, a window of opportunity in which to have the conversation, etc.

A further attribute can be one or more temporal conditions. For instance, during certain times (e.g. hours, days, weeks, months), certain attributes may have greater importance than at other times. As an example, a missed incoming call from the school of a son or daughter of the originating user may be greater in importance if it is received during school hours as opposed to non-school hours.

Still another example of an attribute is one or more channel constraints of the intended future conversation. For instance, a user can indicate that the manner in which intended future conversation can be or must be conducted (e.g. face to face or in a telephone call, instant message or email). Alternatively, the user can indicate that certain equipment is required during the conversation. As an example, a user may indicate that a two-way video feed, projector, etc. is required. Another attribute can be the current channel availability for originating user and other participant(s).

The attribute can be the modality of the channels of conversation. For instance, the user can indicate that the intended future conversation can be fully synchronous, semi-synchronous, or even asynchronous. An additional attribute can be availability status of the identified participants. The availability status can be the availability of a participant and/or the originating user as indicated by any suitable source (e.g. social systems such as Google, Facebook, etc.) of listed participants.

Another attribute may be the ability of the user to conduct a planned conversation in his/her current context. Examples include: the communication capabilities of the user's current client device, the user's projected current free time versus the expected duration of the planned conversation, and the current and/or near-term availability of the participant(s), which may take into account channel restraints.

The one or more attributes can be input by the user. The user may input the one or more attributes of his or her own initiative. Alternatively or in addition, the client device 105 can prompt the user to input one or more attributes. In one embodiment, the system can be configured to automatically prompt the user to input one or more attributes of an intended future conversation as each first input is received.

Alternatively or in addition, the at least one user attribute can be acquired, automatically or by user command, by the conversation module 150 from one or more external information sources. The automatic acquiring of at least one user attribute may occur on any suitable basis, including, for example, continuously, periodically or randomly. In one implementation, the external information sources used to acquire one or more attributes can be the same as the external information sources used to acquire the first inputs. However, in other implementations, the external information sources used to acquire one or more attributes can be different from the external information sources used to acquire the first inputs in one or more respects. The conversation module 150 can be configured by the user or some other entity as to which external sources of information to search for one or more attributes for an intended future conversation. The conversation module 150 can be configured by the user or some other entity or by system default as to which external information sources to acquire attributes relating to an intended future conversation. For instance, a user can configure the conversation module 150 to acquire one or more attributes (e.g. relationship or priority information) from his or her Facebook.

The system 100 can be configured to operate entirely manually, that is, the user provides all of the inputs to the conversation module 150, such as by using one or more client devices 105. Alternatively, the system 100 can be configured to operate automatically, that is, the first inputs and attributes can be acquired by the conversation module 150 without the user having to input such information. Of course, the system 100 can be configured to include combinations of both implementations.

The user may wish to review the inputs representing intended future conversations. The system 100 can generate and output a rank ordered list of the intended future conversations. Accordingly, the conversation module 150 can be configured to receive a second input identifying at least one of the plurality of attributes upon which the rankings of the intended future conversations is based. One or more of the stored attributes may be used as ranking parameters. In response to receiving one or more second inputs, the conversation module 150 can be configured to rank the plurality of future intended conversations in a particular order based on one or more of the identified attributes.

In one implementation, one or more second inputs can be input by a user on a client device 105. Alternatively, one or more second inputs can be input the conversation module 150. For instance, the conversation module 150 can build metrics from other data and use such metrics to rank the intended future conversations. Of course, the second inputs may be input by a combination of user input and the conversation module 150.

A weight can be associated with each of the second inputs. In one embodiment, each of the second inputs can have equal weight. The weight associated with each second input can be predetermined by the user or by a system default.

The conversation module 150 can generate a listing of intended future conversations that is based on the rankings. Generating the listing can be done automatically by the conversation module 150. For instance, generating the listing can be done on a continuous, periodic or random basis. Generating the listing can be done by the conversation module 150 in response to a user command. The listing of the intended future conversations that is based on the rankings can be presented to the user. Such presenting can be done automatically or in response to a user command. For instance, the client device 105 can include an output system for presenting information to the user. The output system can include any suitable type of display. Alternatively or in addition, the output system may include a microphone, earphone and/or speaker. The output system may include a printer communicatively linked to the client device.

The listing of intended future conversations may include all intended future conversations received by the conversation module 150 or at least a subset thereof. As used herein, "at least a subset" means one or more of the intended future conversations. Thus, the system can enable a user to review the list of intended future conversations he/she intend to have at any point and quickly determine which one(s) he/she could/should address at the moment and in the context that he/she reviews the list. The system can allow a user to organize and/or modify the individual entries in the listing of future intended conversations. The user may use patterns from the resulting information to plan and organize the conversations and recall and act on those stored items. In addition to the modification/deletion of planned conversations, the system 100 can allow the user to initiate a conversation.

Further, the conversation module 150 can allow the user to search the intended future conversations. For instance, when only a subset of intended future conversations is presented to the user, the conversation module can allow the user to find conversations that were not ranked high enough to be presented at that moment, but that might need modification. For example, if the system's user stated that a video channel was needed for a future conversation, the constraint may need to be modified if the deadline for having that conversation is near.

In some instances, the system can allow the user to view the list from a single perspective. However, the system can be configured to allow the user to choose one of a plurality of perspectives from which to view a rank-ordered listing of intended future conversations. Examples of perspectives include list all, by urgency, by topic, by person, etc.

The system 100 can be configured to allow a user to can share one or more intended future conversations with other users. In one implementation, the system can be configured such that one or more of the identified participants of an intended future conversation are automatically able to view the intended future conversation is their own list of intended future conversations, which may or may not be identical to the other participants. Further, the importance of the intended future conversation to one participant may be different from the importance of the intended future conversation to another participant. In some implementations, the originating user may select which, if any, of the indicated participants to share the intended future conversations.

The system 100 can allow a user to manage conversations from the list. For instance, the user can input different or additional second inputs identifying at least one of the plurality of attributes upon which the rankings of the intended future conversations is based. The user may be able to manually re-rank individual entries in the list of intended future conversations. Further, the user may be able to modify one or more inputs for one or more of the intended future conversations. In addition, the user may be able to delete one or more of the intended future conversations.

In response to the deletion of one or more intended future conversations and/or modification to one or more aspects of one or more intended future conversations, the system can generate an updated listing of intended future conversations that is based on the rankings. Generating the updated listing can be done automatically or in response to a user command.

The conversation module can receive one or more third inputs that identify a parameter corresponding to the attributes that is used to determine when reminders for intended future conversations are to be presented to the user. Based on the third input, reminders can be provided to the user regarding the intended future conversations.

As an example, the parameter may be the receipt of a communication from a participant of one or more of the intended future conversations. Alternatively or in addition, the parameter may be the initiation by the user of a communication to a participant of one or more of the intended future conversations. The subject matter of the communication may or may not be related to the subject matter of the one or more intended future conversations with the participant. Thus, when the user receives a communication (e.g., email, telephone call, voice message, instant message, text message, etc.) from such a participant, a reminder can be provided to the user regarding one or more of the intended future conversations with the participant. Alternatively or in addition, when the user initiates a communication (e.g., email, telephone call, voice message, instant message, text message, etc.) to such a participant of an intended future conversation, a reminder can be provided to the user regarding one or more of the intended future conversations with the participant.

It should be noted that a user may be able to initiate a conversation using the system. Thus, when reviewing a list of intended future conversations or otherwise, the user may determine that the present moment is an opportune time to conduct one of the intended future conversations. Accordingly, the user may initiate the conversation using the client device 105, any portion of the system 100 or other mode of conversation.

Figure 2:
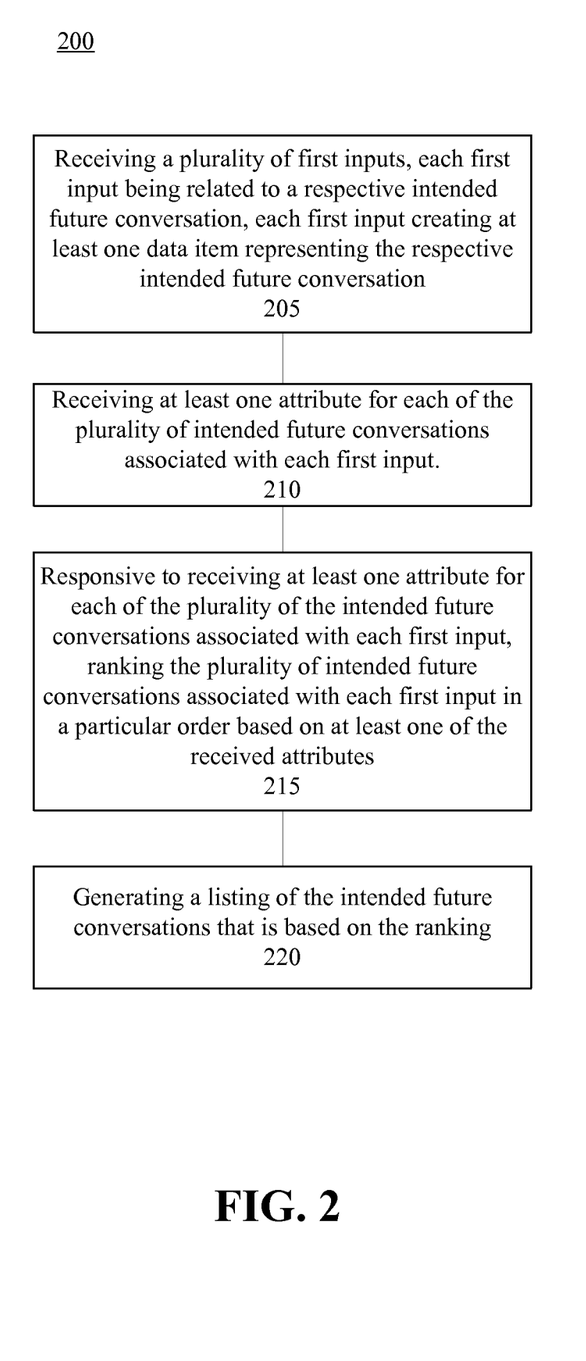
FIG. 2 is a flow chart illustrating a method of managing future intended conversations in accordance with one embodiment disclosed within this specification.

FIG. 2 is a flow chart illustrating a method 200 of managing future intended conversations in accordance with one embodiment disclosed within this specification. At step 205, a plurality of first inputs can be received. Each first input can be related to a respective intended future conversation. Each first input can create at least one data item representing the respective intended future conversation. The receiving of a plurality of first inputs can include automatically acquiring at least one of the plurality of first inputs from at least one of an external information source and/or by a user input.

At step 210, at least one attribute for each of the plurality of intended future conversations associated with each first input can be received. This step can include automatically acquiring at least one attribute for at least one of the plurality of intended future conversations associated with each first input from an external information source (e.g. a social networking website, an electronic communication server and/or a telecommunication system). Alternatively or in addition, this step can include receiving the at least one attribute for at least one of the plurality of intended future conversations associated with each first input by a user input.

At step 215, responsive to receiving at least one attribute for each of the plurality of the intended future conversations associated with each first input, the plurality of intended future conversations associated with each first input can be ranked in a particular order based on at least one of the received attributes. A second input identifying at least one of the received attributes upon which to rank the plurality of intended future conversations associated with-each first input can be received. At step 220, a listing of the intended future conversations that is based on the ranking can be generated.

Some examples of implementations of the system will now be presented. In one example, an individual may post on a system user's page on a social networking website. The post may reflect an intention to have a future conversation (e.g. "Let's talk soon.") Based on that post, the user may select the post in any suitable manner so that it is received as a first input to the system 100. Alternatively, the conversation module 150 may automatically discern the intention to have a future conversation from the post and automatically acquire it as first input to the system. Of course, the user could manually input the post as a first input in the system. The user may manually input or the system may automatically acquire one or more attributes from the post or from the social networking website.

In another example, a system user may miss a telephone call. If a voice message is left for the system user, the system may automatically treat the voice message as a request for a future conversation. Again, the user may manually input the missed call as a first input into the system. The user may manually input or the system may automatically acquire one or more attributes from the voicemail or the missed call.

In a further example, a system user may be instant messaging with another individual. If the instant messaging session must be stopped before the conversation is completed, the participants may declare an intention to continue the conversation. In one embodiment, the system user can manually input the intention to have a future conversation into the system. Alternatively or in addition, a graphical user interface element, such as a button, can be provided to facilitate the user's input by launching the system 100. The system can automatically gather as many information (e.g. attributes) of the conversation as possible from the instant messaging context. For instance, the system may assume that the intended future conversation will be with the same individual and can gather any available relationship information from the instant messaging session. The system can prompt the user for additional attributes, such as the urgency of the future conversation or the time frame in which the future conversation is to occur.

In another example, a system user may receive a request for an instant messaging chat. For instance, the user may be presented a chat window asking "Can you talk now?" If the user is not available to chat at the moment, he or she can launch the system 100 to input it as a first input representing an intended future conversation. Again, the system may automatically acquire any and all information available from the context to use as attributes of the intended future conversation. As an example, because conversation was initiated by instant messaging, the system may assume that this is the desired channel of communication. If there is additional information available from the chat (e.g., "We need to talk right now"), then the system may assume a certain level of priority. The system may also be able to acquire information about the relationship of the two participants.

In a further example, the system can present to a user at least a subset of the listing of intended future conversations based on the current context of the user. For instance, if a user receives an email or other communication from a person who is indicated as a participant of one or more of the user's intended future conversations, then the system can present to the user at least a subset of a listing of intended future conversations, including one or more intended future conversations with the participant. The subject matter of the email or other communication received from the person may or may not be related to the subject matter of any intended future conversations with the user. However, it may nonetheless be beneficial for the user to be made aware of the intended future conversations with the person in this context.

The system can be used in connection with a calendaring system. However, it will be understood that the system can be fully functional without a calendaring system.

Figure 3:
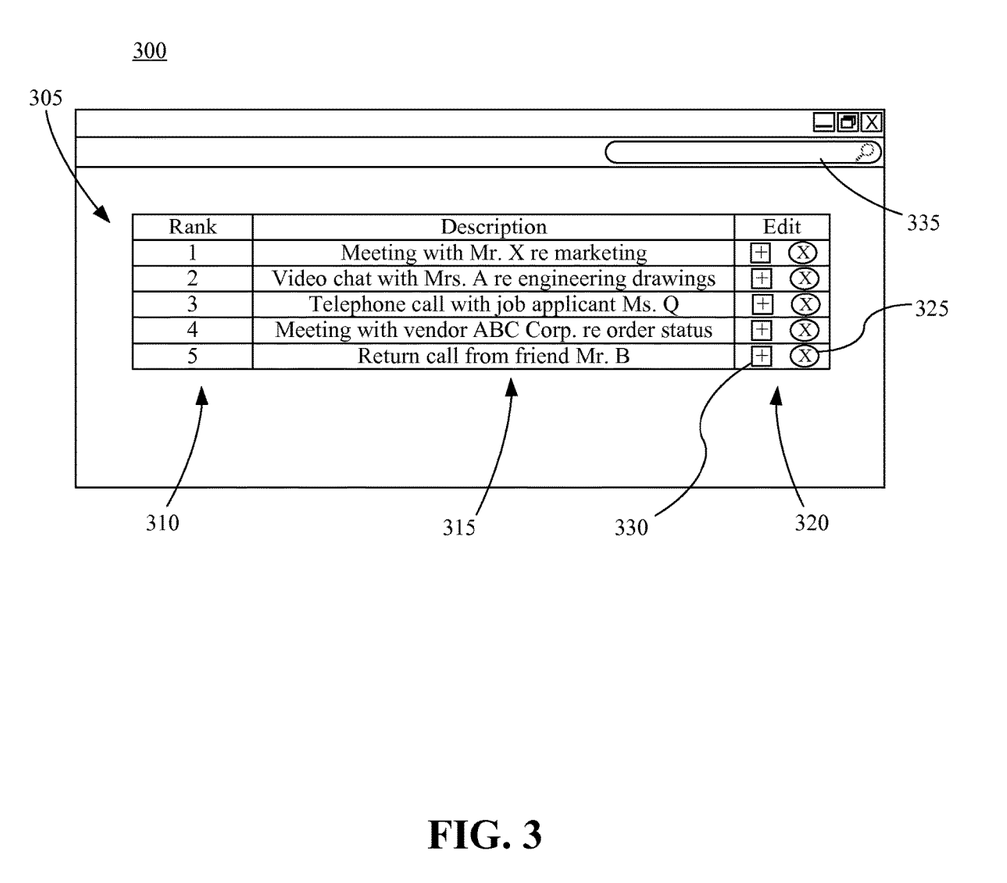
FIG. 3 is a graphical user interface for managing future intended conversations in accordance with one embodiment disclosed within this specification.

FIG. 3 is a view of an example of a graphical user interface (GUI) 300 that can be displayed by a client device 105. The term "graphical user interface element" is defined as an image or a portion of an image that presents information to a user or allows the user to interact with a device through a display. The GUI 300 illustrates the manner in which the system described with reference to FIGS. 1 and 2 can interact with the conversation module 150. The conversation module 150 can execute real-time communication client software that causes the client device 105 to present or display a GUI, such as GUI 300, to the user.

The GUI 300 can be organized and/or arranged in any suitable manner. It will be understood that the GUI presented in FIG. 3 is merely an example, and it can be arranged differently and may include additional or fewer features. The GUI 300 can include a field presenting a rank-ordered listing of intended future conversations 305. The listing 305 may present all intended future conversations or at least a subset of the intended future conversations. The listing 305 may include a column 310 presenting the rank number of the conversation and a column 315 presenting a brief description of the conversation. The listing 305 may also include a column 320 that allows a user to edit individual entries. For instance, the one or more user interface elements, such as graphical user interface elements (e.g. buttons) can be presented to the user. For instance, a user may wish to delete an entry from the listing. In such case, a user may activate select the "X" or delete button 325. Alternatively, the user may wish to review and/or modify one or more aspects of an intended future conversation. In such case, the user can select the "+" or review button 300 to view and/or modify details associated with a selected intended future conversation.

Further, the GUI 300 can allow the user to search the intended future conversations. To that end, a search field 335 can be presented. Thus, the user can input one or more search terms, phrases or characters in the search field. When a search is conducted, a listing of matching of intended future conversations can be presented.

Arrangements described herein can facilitate a user's panning of intended future conversations. By allowing a user to record his or her intent to have a conversation without any precondition (e.g., the availability of all user), arrangements can provide a more flexible and dynamic solution for planning and achieving conversations. Further, arrangements herein can be cognizant of special properties of conversations to provide an effective rank-ordering of future intended conversation. Additionally, the use of social networking websites and social analytics can provide a valuable "people based" and "relationship based" technique for managing intended future conversations that better approximate the way that people weigh the relative importance of said conversations. Moreover, arrangements described herein can accommodate the fast pace of business processes, and the availability of real-time communication channels (e.g., cell phones, instant messaging, etc.) make it much more desirable to take advantage of such opportunities. In addition, arrangements described herein can facilitate the memorializing of intended future conversations so that such conversations are not forgotten or lost.

Figure 4:
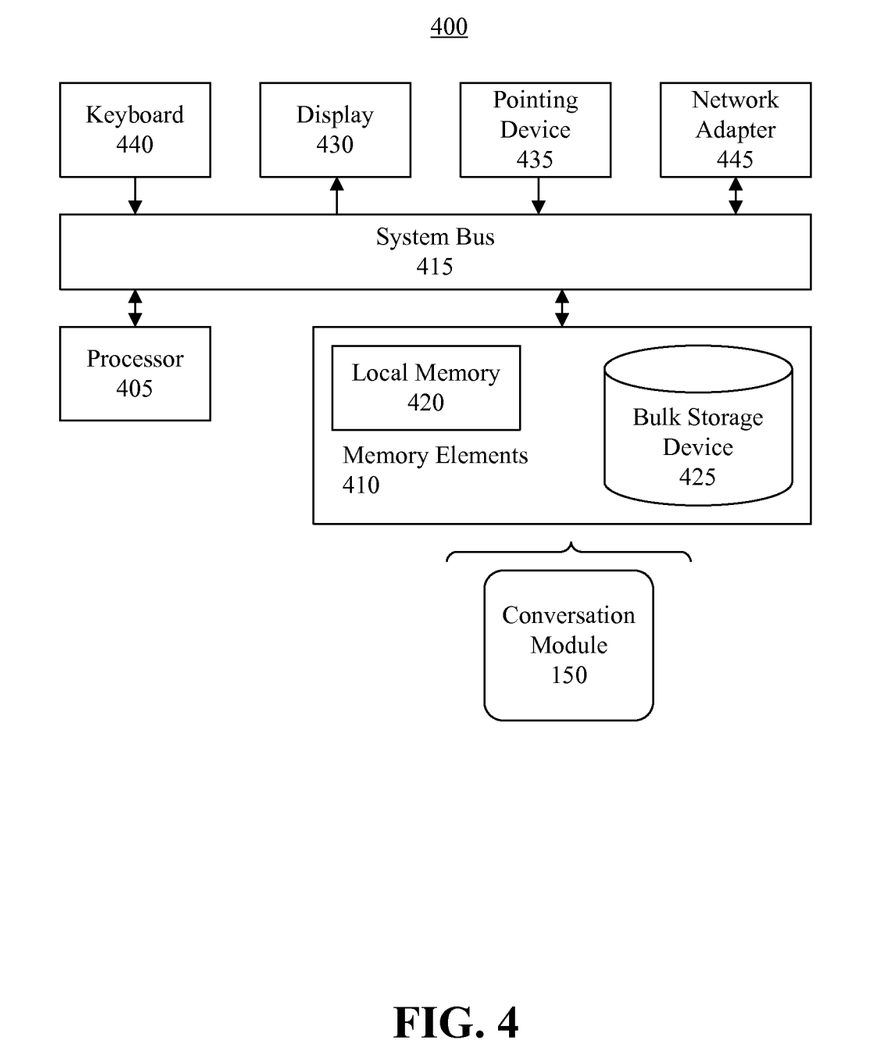
FIG. 4 is a block diagram illustrating a system for managing future intended conversations in accordance with one embodiment disclosed within this specification.

FIG. 4 depicts a block diagram of a processing system 400, which can be included as part of the one or more client devices 105 and/or the one or more conversation servers 110. The processing system 400 can be configured to managing data items representing intended future conversations.

The processing system 400 can include at least one processor 405 (e.g., a central processing unit) coupled to memory elements 410 through a system bus 415 or other suitable circuitry. As such, the processing system 400 can store program code within the memory elements 410. The processor 405 can execute the program code accessed from the memory elements 410 via the system bus 415. It should be appreciated that the processing system 400 can be implemented in the form of any system including a processor and memory that is capable of performing the functions and/or operations described within this specification. For example, the processing system 400 can be implemented as a computer, a workstation, a mobile computer, a laptop computer, tablet computer, a smart phone, a personal digital assistant, a gaming device, an appliance, and so on.

The memory elements 410 can include one or more physical memory devices such as, for example, local memory 420 and one or more bulk storage devices 425. Local memory 420 refers to RAM or other non-persistent memory device(s) generally used during actual execution of the program code. The bulk storage device(s) 425 can be implemented as a hard disk drive (HDD), solid state drive (SSD), or other persistent data storage device. The processing system 400 also can include one or more cache memories (not shown) that provide temporary storage of at least some program code in order to reduce the number of times program code must be retrieved from the bulk storage device 425 during execution.

Input/output (I/O) devices such as a display 430, a pointing device 435 and, optionally, a keyboard 440 can be coupled to the processing system 400. The I/O devices can be coupled to the processing system 400 either directly or through intervening I/O controllers. For example, the display 430 can be coupled to the processing system 400 via a graphics processing unit (GPU), which may be a component of the processor 405 or a discrete device. One or more network adapters 445 also can be coupled to processing system 400 to enable processing system 400 to become coupled to other systems, computer systems, remote printers, and/or remote storage devices through intervening private or public networks. Modems, cable modems, and Ethernet cards are examples of different types of network adapters 445 that can be used with processing system 400.

As pictured in FIG. 4, the memory elements 410 can store the components of the system 100 of FIG. 1, namely the conversation module 150. Being implemented in the form of executable program code, these components of the system 100 can be executed by the processing system 400 and, as such, can be considered part of the processing system 400. Moreover, the conversation module 150 is a functional data structure that imparts functionality when employed as part of the processing system of FIG. 4.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A system comprising:
 a processor programmed to initiate executable operations comprising:
 receiving a plurality of first inputs from a first user, each first input being related to a respective intended future conversation, each first input creating at least one data item representing the respective intended future conversation;
 receiving a plurality of attributes for each of the plurality of intended future conversations associated with each first input, a first attribute of the plurality of attributes indicating a certain equipment required for a corresponding intended future conversation and a second attribute of the plurality of attributes indicating a temporal condition specifying an importance of a certain time relative to other times;
 receiving at least a second input from the first user, the second input identifying at least one parameter corresponding to a third attribute used to determine when a reminder for the intended future conversation is to be presented to the first user, the third attribute corresponding to an initiation by the first user of a communication to a participant of the intended future conversation or the first user receiving a communication from the participant of the intended future conversation;
 automatically acquiring a plurality of third inputs from at least one external information source, the at least one external information source comprising at least one information source selected from a group consisting of an electronic communication server and a social networking website, each third input relating to at least one of the respective intended future conversations;
 responsive to receiving the plurality of attributes for each of the plurality of the intended future conversations associated with each first input and responsive to automatically acquiring the plurality of third inputs from the at least one external information source, a conversation module executed by the processor automatically ranking the plurality of intended future conversations associated with each first input in a particular order based on the received first attribute of the plurality of attributes indicating the certain equipment required for the corresponding intended future conversation, based on the second attribute of the plurality of attributes indicating the temporal condition specifying the importance of the certain time relative to the other times, and based on at least one of the plurality of third inputs;

generating a listing of the intended future conversations that is based on the ranking;

displaying, in a graphical user interface on a client device, a rank-ordered listing of the intended future conversations, the rank-ordered listing, based on the received first attribute of the plurality of attributes indicating the certain equipment required for the corresponding intended future conversation, based on the second attribute of the plurality of attributes indicating the temporal condition specifying the importance of the certain time relative to the other times, and based on at least one of the plurality of third inputs, of the intended future conversations comprising a first column presenting a respective rank number of each of the intended future conversations, a second column presenting a brief description of each of the intended future conversations, and a third column that allows the first user to edit entries in the first column or the second column; and responsive to the initiation by the first user of the communication to the participant of the intended future conversation or the first user receiving the communication from the participant of the intended future conversation, based on the third attribute, presenting to the first user the reminder for the intended future conversation.

2. The system of 1, wherein automatically ranking the plurality of intended future conversations is based, at least in part, on availability of the certain equipment required for the corresponding intended future conversation.

3. The system of claim 2, wherein the certain equipment required for the corresponding intended future conversation is selected from a group of equipment consisting of a projector and a multi-feed video system.

4. The system of claim 1, wherein:
a fourth attribute of the plurality of attributes further indicates a required availability of a particular type of communication channel; and
the plurality of intended future conversations are automatically ranked based on the required availability of the particular type of communication channel.

5. The system of claim 1, wherein:
a fourth attribute of the plurality of attributes further indicates a communication channel modality for the corresponding intended future conversation; and
the plurality of intended future conversations are automatically ranked based on the indicated communication channel modality for the corresponding intended future conversation.

6. The system of claim 5, wherein the communication channel modality is a selected from a group consisting of a fully synchronous modality, a semi-synchronous modality and an asynchronous modality.

7. The system of claim 1, wherein:
a fourth attribute of the plurality of attributes further indicates a required communication capability of a client device of at least one participant of the corresponding intended future conversation; and
the plurality of intended future conversations are automatically ranked based on the indicated required communication capability of the client device.

8. A computer program product comprising a computer readable storage medium having program code stored thereon, the program code executable by a processor to perform a method comprising:

receiving, by the processor, a plurality of first inputs from a first user, each first input being related to a respective intended future conversation, each first input creating at least one data item representing the respective intended future conversation;

receiving, by the processor, a plurality of attributes for each of the plurality of intended future conversations associated with each first input, a first attribute of the plurality of attributes indicating a certain equipment required for a corresponding intended future conversation and a second attribute of the plurality of attributes indicating a temporal condition specifying an importance of a certain time relative to other times;

receiving, by the processor, at least a second input from the first user, the second input identifying at least one parameter corresponding to a third attribute used to determine when a reminder for the intended future conversation is to be presented to the first user, the third attribute corresponding to an initiation by the first user of a communication to a participant of the intended future conversation or the first user receiving a communication from the participant of the intended future conversation;

automatically acquiring a plurality of third inputs from at least one external information source, the at least one external information source comprising at least one information source selected from a group consisting of an electronic communication server and a social networking website, each third input relating to at least one of the respective intended future conversations;

responsive to receiving the plurality of attributes for each of the plurality of the intended future conversations associated with each first input and responsive to automatically acquiring the plurality of third inputs from the at least one external information source, a conversation module executed by the processor automatically ranking the plurality of intended future conversations associated with each first input in a particular order based on the received first attribute of the plurality of attributes indicating the certain equipment required for the corresponding intended future conversation, based on the second attribute of the plurality of attributes indicating the temporal condition specifying the importance of the certain time relative to the other times, and based on at least one of the plurality of third inputs;

generating, by the processor, a listing of the intended future conversations that is based on the ranking;

displaying, in a graphical user interface on a client device, a rank-ordered listing, based on the received first attribute of the plurality of attributes indicating the certain equipment required for the corresponding intended future conversation, based on the second attribute of the plurality of attributes indicating the temporal condition specifying the importance of the certain time relative to the other times, and based on at least one of the plurality of third inputs, of the intended future conversations, the rank-ordered listing of the intended future conversations comprising a first column presenting a respective rank number of each of the intended future conversations, a second column presenting a brief description of each of the intended future conversations, and a third column that allows the first user to edit entries in the first column or the second column; and responsive to the initiation by the first user of the communication to the participant of the intended future conversation or the first user receiving the communication from the participant of the intended future conversation, based on the third attribute, presenting to the first user the reminder for the intended future conversation.

9. The computer program product of 8, wherein automatically ranking the plurality of intended future conversations is based, at least in part, on availability of the certain equipment required for the corresponding intended future conversation.

10. The computer program product of claim 9, wherein the certain equipment required for the corresponding intended future conversation is selected from a group of equipment consisting of a projector and a multi-feed video system.

11. The computer program product of 8, wherein:
a fourth attribute of the plurality of attributes further indicates a required availability of a particular type of communication channel; and
the plurality of intended future conversations are automatically ranked based on the required availability of the particular type of communication channel.

12. The computer program product of 8, wherein:
a fourth attribute of the plurality of attributes further indicates a communication channel modality for the corresponding intended future conversation; and
the plurality of intended future conversations are automatically ranked based on the indicated communication channel modality for the corresponding intended future conversation.

13. The computer program product of claim 12, wherein the communication channel modality is a selected from a group consisting of a fully synchronous modality, a semi-synchronous modality and an asynchronous modality.

14. The computer program product of 8, wherein:
a fourth attribute of the plurality of attributes further indicates a required communication capability of a client device of at least one participant of the corresponding intended future conversation; and
the plurality of intended future conversations are automatically ranked based on the indicated required communication capability of the client device.

15. A method, comprising:
receiving a plurality of first inputs from a first user, each first input being related to a respective intended future conversation, each first input creating at least one data item representing the respective intended future conversation;
receiving a plurality of attributes for each of the plurality of intended future conversations associated with each first input, a first attribute of the plurality of attributes indicating a certain equipment required for a corresponding intended future conversation and a second attribute of the plurality of attributes indicating a temporal condition specifying an importance of a certain time relative to other times;
receiving at least a second input from the first user, the second input identifying at least one parameter corresponding to a third attribute used to determine when a reminder for the intended future conversation is to be presented to the first user, the third attribute corresponding to an initiation by the first user of a communication to a participant of the intended future conversation or the first user receiving a communication from the participant of the intended future conversation;
automatically acquiring a plurality of third inputs from at least one external information source, the at least one external information source comprising at least one information source selected from a group consisting of an electronic communication server and a social networking website, each third input relating to at least one of the respective intended future conversations;
responsive to receiving the plurality of attributes for each of the plurality of the intended future conversations associated with each first input and responsive to automatically acquiring the plurality of third inputs from the at least one external information source, a conversation module executed by a processor automatically ranking the plurality of intended future conversations associated with each first input in a particular order based on the received first attribute of the plurality of attributes indicating the certain equipment required for the corresponding intended future conversation, based on the second attribute of the plurality of attributes indicating the temporal condition specifying the importance of the certain time relative to the other times, and based on at least one of the plurality of third inputs;
generating a listing of the intended future conversations that is based on the ranking;
displaying, in a graphical user interface on a client device, a rank-ordered listing, based on the received first attribute of the plurality of attributes indicating the certain equipment required for the corresponding intended future conversation, based on the second attribute of the plurality of attributes indicating the temporal condition specifying the importance of the certain time relative to the other times, and based on at least one of the plurality of third inputs, of the intended future conversations, the rank-ordered listing of the intended future conversations comprising a first column presenting a respective rank number of each of the intended future conversations, a second column presenting a brief description of each of the intended future conversations, and a third column that allows the first user to edit entries in the first column or the second column; and responsive to the initiation by the first user of the communication to the participant of the intended future conversation or the first user receiving the communication from the participant of the intended future conversation, based on the third attribute, presenting to the first user the reminder for the intended future conversation.

16. The method of claim 15, wherein automatically ranking the plurality of intended future conversations is based, at least in part, on availability of the certain equipment required for the corresponding intended future conversation.

17. The method of claim 16, wherein the certain equipment required for the corresponding intended future conversation is selected from a group of equipment consisting of a projector and a multi-feed video system.

18. The method of claim 15, wherein:
a fourth attribute of the plurality of attributes further indicates a required availability of a particular type of communication channel; and
the plurality of intended future conversations are automatically ranked based on the required availability of the particular type of communication channel.

19. The method of claim 15, wherein:
a fourth attribute of the plurality of attributes further indicates a communication channel modality for the corresponding intended future conversation; and
the plurality of intended future conversations are automatically ranked based on the indicated communication channel modality for the corresponding intended future conversation.

20. The method of claim 15, wherein:
a fourth attribute of the plurality of attributes further indicates a required communication capability of a client device of at least one participant of the corresponding intended future conversation; and
the plurality of intended future conversations are automatically ranked based on the indicated required communication capability of the client device.

* * * * *